United States Patent Office

3,519,448
Patented July 7, 1970

3,519,448
ZIRCONIA-ALUMINA FUSED REFRACTORY
MATERIALS AND STRUCTURES
Allen M. Alper and Robert N. McNally, Corning, N.Y.,
assignors to Corhart Refractories Company, Louisville,
Ky., a corporation of Delaware
No Drawing. Continuation-in-part of application Ser. No.
643,337, June 5, 1967. This application Jan. 26, 1968,
Ser. No. 700,748
Int. Cl. C04b *35/48*
U.S. Cl. 106—57          15 Claims

ABSTRACT OF THE DISCLOSURE

Fused refractory materials and structures of the zirconia-alumina type containing large zirconia crystals as a primary phase. Composition consists essentially of, analytically by weight: at least 50% $ZrO_2$, 1 to 29% $Al_2O_3$, 0.1 to 25% $SiO_2$, 0.5 to 15% rare earth oxide, 0 to 6% $P_2O_5$, 0 to 5% alkaline earth oxide, 0 to 4% alkali oxide, 0 to 47% $Cr_2O_3$, 0 to 25% FeO, 0 to 4% halogen, and at least 90% of $ZrO_2$ plus $Al_2O_3$ plus $SiO_2$ plus rare earth oxide plus $Cr_2O_3$ plus FeO plus halogen. Structures useful in glass tanks exhibit corrosion, wear, high temperature and thermal shock resistance and low blistering and stoning.

CROSS-REFERENCE TO RELATED APPLICATION

This is a continuation-in-part of application Ser. No. 643,337, filed June 5, 1967 now abandoned.

BACKGROUND OF THE INVENTION

Field of the invention

The present invention relates to fused refractory materials and to articles produced from such materials. More specifically, the invention is concerned with improved fused refractory materials of the zirconia-alumina type having particular value in glass tanks due to their excellent corrosion, wear, high temperature and thermal shock resistance and low blistering and stoning.

Description of the prior art

Fused-cast refractory materials comprising substantial amounts of alumina, zirconia and silica have previously been disclosed in Japanese patent application 40,792/1960 of Oct. 10, 1960, published on Sept. 18, 1962 as publication No. 14,348/1962. The application is entitled "Zirconia-Alumina Type Cast Refractory Body" and was filed in the names of Hideo Nagashima, Eiji Miyake and Akira Ito, as inventors.

The materials disclosed in the published Japanese application are useful in many applications, but have been found wanting in several respects. For example, in melting high temperature glasses the prior materials have been found to lack the necessary refractoriness, melting as they do at from about 1600° to 1750° C. The previously disclosed materials also contain a large amount of extremely fine zirconia crystals included intragranularly in the alumina crystals as a result of the low zirconia/alumina ratio. Large amounts of fine zirconia particles lead to problems of stoning and accelerate the corrosion rate of the refractory.

SUMMARY OF THE INVENTION

The object of the present invention is to provide fused refractory materials characterized by excellent resistance to corrosion, wear, high temperature and thermal shock, and structures made of such materials.

Another object is to provide fused refractory materials which exhibit low stoning and blistering and excellent corrosion resistance when contacted by molten glass, and structures made of such materials.

Another important purpose is to provide fused refractory material containing large crystals of zirconia and in which often the formation of non-fragmented interlocked zirconia crystal chains is promoted. Such a structure, having a coarse microstructure of zirconia, tends to retard stoning and has superior corrosion resistance.

In accordance with the present invention, it has now been found that a fused refractory material satisfying the above discussed and other desirable objectives comprises primarily large zirconia crystals (and can also have discrete corundum or alpha alumina crystals and/or a siliceous glassy phase) and is composed essentially of the following constituents, analytically by weight:

| | Percent |
|---|---|
| $ZrO_2$ | at least 50 |
| $Al_2O_3$ | 1 to 29 |
| $SiO_2$ | 0.1 to 25 |
| Rare earth oxides | 0.5 to 15 |
| $P_2O_5$ | up to about 6 |
| Alkaline earth oxide | up to about 5 |
| Alkali metal oxide | up to about 4 |

In another embodiment of the invention, it has been found that a further improvement in the corrosion resistance of the above described fused refractory materials may be realized by the addition to the composition of 0.25 to 47%, and preferably 1 to 15%, of $Cr_2O_3$.

According to another embodiment, it has been found that the density of the fused cast refractory materials of the invention may be increased, the manufacturability may be improved and the coloring of the glass contacting the refractory may be slightly decreased by the addition to the composition of 0.03 to 4%, and preferably 0.1 to 2%, of a halogen, preferably fluorine. The benefits of the halogen addition are derived whether or not the fused refractory in which it is incorporated also contains the $Cr_2O_3$ additive. The halogen helps to produce denser castings.

As used herein, "rare earth oxide" means oxide of one or more of the metallic rare earth elements having an atomic number of 21, 39 and 57 through 71.

Of course, the fused material product will contain incidental impurities normally associated with the raw materials. In some cases, such impurity constituents can be in somewhat substantial amounts, or they may be deliberately added separately in such amounts. For example, iron oxides (all computed as FeO) can amount to about 25%, especially in combination with amounts of $Cr_2O_3$. Thoria ($ThO_2$) is frequently present as a substantial constituent of many rare earth oxide containing ores which may be used to provide the rare earth oxide content of the present fused refractory materials. It is permissible to include thoria in these fused materials in amounts up to about 5% (or even about 10%) by weight. In any event, the new fused materials should consist essentially of at least 90% by weight of $ZrO_2$ plus $Al_2O_3$ plus $SiO_2$ plus rare earth oxide plus $Cr_2O_3$ plus FeO plus halogen, which limitation is applicable even in those situations where certain ones of these constituents are absent.

Articles and structures produced from the described fused refractory material may take any of the usual forms, such as, fused cast articles, grain and rebonded grain.

DESCRIPTION OF PREFERRED EMBODIMENTS

In a preferred embodiment, the fused refractory composition, without $Cr_2O_3$ or fluorine additions, has the following essential composition analytically on a weight basis:

| | Percent |
|---|---|
| $ZrO_2$ | at least 60 |
| $Al_2O_3$ | 2 to 21 |
| $SiO_2$ | 4 to 18 |
| Rare earth oxide | 1.5 to 9 |
| $P_2O_5$ | up to about 3.5 |
| Alkaline earth oxide | up to about 2.5 |
| Alkali oxide | up to about 2.5 |
| At least 93% of $ZrO_2$ plus $Al_2O_3$ plus $SiO_2$ plus rare earth oxide. | |

Some alkali oxide, e.g. $Na_2O$, in an amount of 0.5 to 1.5% is helpful in decreasing the formation of blisters in molten glass contacting the refractory material.

Where $Cr_2O_3$ is added, the material has the following composition stated in broad and narrow, or more preferred, ranges of each constituent, analytically on a weight basis:

| | Broad Range | Narrow Range |
|---|---|---|
| $ZrO_2$ | 50% to 98% | 60% to 87.5%. |
| $Al_2O_3$ | 1% to 29% | 5% to 21%. |
| $SiO_2$ | 0.1% to 25% | 4% to 18%. |
| Rare earth oxide | 0.5% to 15% | 1.5% to 9.0%. |
| $P_2O_5$ | Up to about 6% | 1% to 3.5%. |
| Alkaline earth oxides | Up to about 5% | Up to about 2.5%. |
| Alkali oxides | Up to about 4% | Do. |
| FeO | Up to about 25% | Up to about 7%. |
| $Cr_2O_3$ | 0.25% to 47% | 1% to 15%. |
| Sum of $ZrO_2+Al_2O_3+SiO_2+$ rare earth oxide+FeO+$Cr_2O_3$. | At least 90% | At least 93%. |

Where fluorine is added to the fused refractory material, the material has the following composition, stated in broad and narrow, i.e. more preferred, ranges of each constituent, analytically on a weight basis:

| | Broad Range | Narrow Range |
|---|---|---|
| $ZrO_2$ | 50% to 98% | 60% to 89.4%. |
| $Al_2O_3$ | 1% to 29% | 5% to 21%. |
| $SiO_2$ | 0.1% to 25% | 4% to 18%. |
| Rare earth oxide | 0.5% to 15% | 1.5% to 9%. |
| $P_2O_5$ | Up to about 6% | 1% to 3.5%. |
| Alkaline earth oxide | Up to about 5% | Up to about 2.5%. |
| Alkali oxide | Up to about 4% | Do. |
| Fluorine | 0.03% to 4% | 0.1% to 2%. |
| Sum of $ZrO_2+Al_2O_3+SiO_2+$ rare earth oxide+fluorine. | At least 90% | At least 93%. |

The present invention also contemplates refractory structures including individual cast bricks, plates, slabs or other shapes, and structures incorporating one or more fused cast articles, such as refractory glass tanks, furnaces, high temperature nozzles, for molten steel or high temperature gases or the like, formed by one or a plurality of assembled fused cast articles.

The invention also contemplates the production of grains of the fused refractory material and the formation of articles from rebonded grains.

The materials of the invention are produced by mixing a batch of the necessary raw materials and melting by any available technique as described, for example, in U.S. Pat. 1,700,288 and U.S. Pat. 3,079,452.

As the basic raw materials for preparing the refractories of the invention, it is preferred to use zirconia, alumina and monazite. The last is a natural mineral having a substantial rare earth oxide content.

In the previosu description and in the claims, zirconia refers to the pure compound. However, the commercially available zirconia generally contains substantial amounts of alumina and silica. Therefore, in the following description and examples, unless otherwise noted, the zirconia refers to a commercial zirconia source, specifically "Norton Q-23 Zirconia," the typical analysis of which, on a weight basis, is as follows:

| | Percent |
|---|---|
| $ZrO_2$ | 85.03 |
| $Al_2O_3$ | 10.0 |
| $SiO_2$ | 4.36 |
| $Fe_2O_3$ | 0.15 |
| $TiO_2$ | 0.18 |
| CaO | 0.28 |

The alumina employed in producing the fused-cast refractory materials is "Alcoa A-2" and is substantially all $Al_2O_3$.

The monazite referred to in the subsequent description and examples, unless otherwise noted, is Titanium Alloy Co. monazite having the following typical analysis, by weight:

About 60%–65% rare earth oxides and $ThO_2$ as follows:

| | Percent |
|---|---|
| $CeO_2$ | from 20 to 25 |
| $La_2O_3$ | from 12 to 15 |
| $Nd_2O_3$ | from 10 to 12 |
| $ThO_2$ | from 4 to 5 |
| $Y_2O_3$ | from 1.5 to 3 |

About 25%–30% $P_2O_5$.
About 2% each of $SiO_2$ and $ZrO_2$.
The balance, minor amounts of $Al_2O_3$, $Fe_2O_3$, $MnO_2$, PbO, MgO, $TiO_2$, CaO, CuO.

Another source of rare earth oxide which could be used in producing the present materials is bastnesite which is a rare earth fluorcarbonate available in a number of grades from Molybdenum Corp. of America. One available leached concentrate of bastnesite has the following general typical analysis:

| | Percent |
|---|---|
| Rare earth oxide | 68–73 |
| Barium sulphate | 1–3 |
| Calcium oxide | 0.3–0.5 |
| $SiO_2$ | 0.3–0.5 |
| Fluorine | 5.0–5.0 |
| $ThO_2$ | less than 0.1 |
| $Fe_2O_3$ | less than 0.3 |
| $P_2O_5$ | less than 0.2 |
| Loss on ignition | 20–21 |

The invention will be more fully appreciated in the light of the following examples.

EXAMPLES 1–3

A batch of raw materials was prepared by mixing, by weight, 80% zirconia (Norton Q-23), 10% alumina (Alcoa A-2), and 10% monazite (Titanium Alloy Co.). The batch was melted and cast to form a brick. The resulting fused cast brick is referred to as Refractory A in the following table.

Small slices of the Refractory A material 1 3/16" square by 3/16" thick were then cut from the brick by diamond grinding and were polished, washed and oven dried at 110° C.

The specimens were tested for blistering in contact with three different types of glass, (1) a borosilicate glass, (2) a soda lime glass, and (3) a barium oxide glass.

A typical borosilicate glass used in the test has the following composition on a percent by weight basis: 79.8% $SiO_2$, 12.2% $B_2O_3$, 4.0% $Na_2O$, 2.8% $Al_2O_3$, 0.4% $K_2O$ and 0.8% CaO.

A typical soda-lime glass used in the test has the following composition on a percent by weight basis: 73.4% $SiO_2$, 16.72% $Na_2O$, 0.12% potash, 4.96% CaO, 3.30% MgO and 1.45% $Al_2O_3$.

A typical barium oxide glass used in the test has the following composition on a percent by weight basis: 65.7% $SiO_2$, 12.1% BaO, 6.7% $Na_2O$, 6.6% $K_2O$, 0.4% $Li_2O$, 0.4% $Rb_2O$, 3.4% $Al_2O_3$, 1.8% F, 0.6% $MnO_2$ and 0.1% $TiO_2$.

For purposes of comparison, specimens of an available and commercially utilized zirconia-alumina fused cast refractory were tested for blistering under the same circumstances. The standard or comparison material is a zirconia-alumina-silica refractory which is fully described in U.S. Pat. 3,132,953.

The standard refractory has the following typical analysis on a weight basis:

| | Percent |
|---|---|
| $Al_2O_3$ | 49 |
| $Zr_2O_3$ | 34 |
| $SiO_2$ | 15 |
| $Na_2O$ | 1.5 |
| Fluorine | 0.2 |
| $Fe_2O_3$, $TiO_2$, $B_2O_3$ | Balance |

The standard or comparison material is referred to as Refractory B in the following table.

The blister testing was carried out in the following manner:

A 1″ x 1″ x ⅛″ sample having a highly ground surface, is pre-heated to 1400° C. for 15 minutes in the furnace. Then the glass is added to the sample to wet the surface with the borosilicate or other test glass. The test is run at 1400° C. for an additional 15 minutes. After the test is completed, the sample is rated by a direct visual comparison with a scale of blistering standards.

Blistering is the presence of bubbles in the re-solidified glass due to interaction of the molten glass at the interface with the refractory. Blistering may be rated in a number of ways, but the system here used is based on direct visual comparison with a scale of blistering standards. The standards are based on bubble population and size.

The standards were established after numerous tests by arbitrarily assigning a 100 (no unit) value to the greatest amount of blistering observed. An absence of blistering is considered to be a zero value. On this basis, the tests reported below were arranged, compared, and assigned proportionate ratings.

In the present instance, the following blister ratings were observed with the refractory of this invention, Refractory A, and the comparison material, identified as Refractory B:

| Example No. | Refractory | Glass | Blister Rating |
|---|---|---|---|
| 1 | A | Borosilicate | 16 |
| 1 | B | do | 38 |
| 2 | A | Soda-lime | 12 |
| 2 | B | do | 18 |
| 3 | A | Barium oxide | 14 |
| 3 | B | do | 28 |

It is apparent from the above that the present refractory provides a substantial reduction in Blister Rating, on the order of 50%, in comparison with the standard zirconia-alumina refractory.

EXAMPLES 4–7

Specimens of the Refractory A of the invention were prepared as in Examples 1–3 and were compared for corrosion resistance with standard or comparison Refractory B.

Elongated specimens of the Refractories A and B were suspended in melts of glasses of different compositions for varying periods of time. The amount of cut or reduction in diameter of each specimen was then measured, after removal from the melt. Measurements were taken at two points on the sepcimen, one at the melt line, i.e., the point on the specimen adjacent the air-glass melt interface, and a second at a point mid-way between the melt line and the end of the specimen which has been submerged beneath the molten glass. The smaller the cut, the greater is the corrosion resistance of the refractory.

The composition of the barium oxide and soda-lime glasses used in the tests are given above in connection with Examples 1–3.

The barium silicate glass has the following composition on a percent by weight basis: 63.5% $SiO_2$, 7.5% $Na_2O$, 10.4% $K_2O$, 6.7% BaO, 4.5% CaO, 4.8% MgO, 3.8% $Al_2O_3$, 1.8% F, 0.5% $TiO_2$, and 0.2% $CeO_2$.

The calcium-aluminum-boron silicate glass has the following composition on a percent by weight basis: 54.5% $SiO_2$, 14.2% $Al_2O_3$, 17.5% CaO, 4.8% MgO, 7.7% $B_2O_3$, 0.4% $Na_2O+K_2O$, 0.5% $Fe_2O_3$, 0.2% $TiO_2$ and 0.1% $ZrSiO_4$.

The results of comparative tests are set forth in the following data:

| | | | | | Extent of Cut, mm. | |
|---|---|---|---|---|---|---|
| Example Number | Ref. | Glass | Temp., °C. | Time | Melt Line | Mid-Point |
| 4 | A | Barium oxide | 1,550 | 7 days | .98 | 0.1 |
| 4 | B | do | 1,550 | do | 1.42 | 1.05 |
| 5 | A | Barium silicate | 1,550 | do | 1.29 | 0.19 |
| 5 | B | do | 1,550 | do | 2.80 | 1.30 |
| 6 | A | Soda-lime | 1,538 | 72 hours | 2.24 | 0.51 |
| 6 | B | do | 1,538 | do | 5.00 | 5.00 |
| 7 | A | Calcium-alumina-boron silicate | 1,538 | 96 hours | 1.41 | 0.88 |
| 7 | B | do | 1,538 | do | 5.00 | 5.00 |

It will be seen from the above data that, in every case, Refractory A, the material of this invention, exhibited very superior corrosion resistance, as compared with Refractory B, the high alumina comparison refractory.

EXAMPLES 8–10

Refractory materials were then prepared as in Examples 1–3, but varying the content of monazite to 15% in one batch and 5% in another. The amount of alumina was adjusted to compensate for the change in monazite content. Refractories were prepared from each batch as before and were compared with the standard Refractory B for corrosion resistance. Refractory C has a composition of, by weight, 80% zirconia, 15% alumina and 5% monazite. Refractory D has a composition of, by weight, 80% zirconia, 5% alumina and 15% monazite. Refractory D–1 has a composition of, by weight, 60% zirconia, 20% alumina and 20% monazite.

| | | | | | Extent of Cut, mm. | |
|---|---|---|---|---|---|---|
| Ex. No. | Ref. | Glass | Temp., °C. | Time, hrs. | Melt Line | Mid-point |
| 8 | B | Soda-lime | 1,538 | 72 | 2.60 | 0.56 |
| 9 | C | do | 1,538 | 72 | 1.67 | 0.40 |
| 10 | D | do | 1,538 | 72 | 5.00 | 5.00 |
| 10(a) | D–1 | do | 1,538 | 72 | 2.50 | 0.62 |

Thus, the results of Examples 8–10 indicate that a combination of lower alumina content and a monazite content of 15% or above reduces the corrosion resistance to molten soda-lime glass of the present refractories below that of the standard Refractory B. However, Example 10(a) shows that the higher monazite content can be employed with the higher alumina content to provide resistance to soda-lime glass corrosion. For soda-lime glass service, it is definitely desirable to have at least 15 wt. percent $Al_2O_3$ when the new refractory material contains about 9 wt. percent or more of rare earth oxide derived from monazite. In service with other glasses having a substantial alumina content, the new refractory material having lower alumina combined with higher monazite provides much better resistance to corrosion.

Another factor indicated by the results of Examples

8–10 is that a reduction of the monazite content to 5% with corresponding increase in the alumina content provides improved corrosion resistance.

EXAMPLES 11–16

Additional refractories were prepared as in Examples 1–3, but varying the weight proportions as set forth below:

|  | Zirconia, percent | Alumina, percent | Monazite, percent |
|---|---|---|---|
| Refractory E | 62 | 30 | 8 |
| Refractory F | 53 | 40 | 7 |
| Refractory G | 44 | 50 | 6 |
| Refractory H | 35.5 | 60 | 4.5 |

Specimens of each refractory were then immersed in molten soda-lime glass at 1538° C. for 72 hours to observe corrosion resistance and stoning. In the present context, stoning refers to the presence of inclusions in the resolidified glass after a melt of the glass has contacted the refractory. In this case the stones are attributable to interaction with the refractory with which the glass is in conact. Refractories causing the formation of stones are of course undersirable for use as glass tanks or other structures which contact molten glass, since they impart undesirable properties to the glass product.

Comparisons were made with the standard Refractory B and the results are reported in the following data:

| Example Number | Refractory | Extent of Cut, mm. Melt Line | Stones |
|---|---|---|---|
| 11 | E | 1.84 | None. |
| 12 | F | 2.63 | Many. |
| 13 | B | 5.00 | Do. |
| 14 | G | 1.87 | Do. |
| 15 | H | 2.88 | Do. |
| 16 | B | 2.41 | Do. |

As the zirconia content is decreased progressively in refractories E through H, the presence of many stones is found on observation of the re-solidified glass from the melts which have been in contact with the refractory. In Example 11, Refractory E contains 62% zirconia (Norton Q-23) which contains about 85% $ZrO_2$. Thus, Refractory E contains about 53% $ZrO_2$ and is free from stoning. However, in Example 12, Refractory F contains 53% zirconia (Norton Q-23) or about 45% $ZrO_2$ and produces many stones in the glass which it contacts. In Examples 14 and 15, stoning also results as the $ZrO_2$ content is reduced farther below 50% in Refractories G and H. Therefore, in accordance with the invention the refractories must contain at least 50% $ZrO_2$ to minimize the problem of stoning. Stoning is also found in the glass contacted by Refractory B, under the same conditions, as shown in Examples 13 and 16.

EXAMPLES 17–20

Likewise, it has been established that low zirconia and alumina contents, in a constant ratio, and high rare earth oxide and $P_2O_5$ contents, obtained by increasing the monazite content results in refractories having poor corrosion resistance and high stoning.

Refractories were prepared as in Examples 1–3, varying the weight proportions as follows:

| Refractory | Zirconia, percent | Alumina, percent | Monazite, percent |
|---|---|---|---|
| I | 20 | 20 | 60 |
| J | 30 | 30 | 40 |
| K | 40 | 40 | 20 |

The results, after contact with a soda-lime glass for 72 hrs. at 1538° C., are shown in the following data:

| Example Number | Refractory | Extent of Cut, mm. Melt Line | Stones |
|---|---|---|---|
| 17 | I | 5.00 | Many. |
| 18 | J | 5.00 | Do. |
| 19 | K | 2.77 | Do. |
| 20 | B | 5.00 | Do. |
| 20 | B | 5.00 | Do. |

EXAMPLES 21–27

Additional refractories were prepared and were compared with the standard Refractory B. The specimens were contacted with molten soda-lime glass at 1538° C. for 72 hours. The results are shown in the following data:

| Example Number | Refractory Composition, wt. percent Zirconia-Alumina-Monazite | | | Extend of Cut, mm. | | Stones |
|---|---|---|---|---|---|---|
| | (Norton Q-23) | (Alcoa A-2) | (Titanium Alloy Co.) | Melt Line | Mid-Point | |
| 21 | Refractory B | | | 3.02 | 0.62 | Many. |
| 22 | 80 | 10 | 10 | 2.21 | 0.51 | None. |
| 23 | 71 | 20 | 9 | 1.79 | 0.32 | Do. |
| 24 | 80 | 10 | 10 | 2.42 | 0.72 | Do. |
| 25 | 90 | 5 | 5 | 2.25 | 0.56 | Do. |
| 26 | 90 | 5 | (¹) | 1.95 |  | Do. |
| 27 | 80 | 15 | 5 | 2.27 | 0.75 | Do. |

¹ 5% REO.

It is seen from the above data that substantial improvement in corrosion resistance and absence of stoning are experienced with the materials of this invention.

As already discussed briefly above, in one embodiment of the invention $Cr_2O_3$ is added to the basic refractory composition to improve corrosion resistance. This has particular utility in structures which contact molten calcium-alumina-boron-silicate glasses. Standard chrome bricks, conventionally used in glass tanks, crack in contact with such glasses. The following examples illustrate the improvement in corrosion resistance experienced as a result of the $Cr_2O_3$ addition to the present refractories.

EXAMPLES 28–29

A refractory batch was prepared by mixing, by weight, 80% zirconia, 10% alumina and 10% monazite. The batch was melted and cast to form a refractory block from which specimens were cut. A second refractory batch was prepared by mixing, by weight, 80% zirconia, 6% alumina, 10% monazite and 4% $Cr_2O_3$, and this batch was also melted, cast and cut to provide specimens.

The specimens were then immersed in a molten calcium-alumina-boron silicate glass bath at 1538° C. for 96 hours. The composition of the glass was the same as that used in Example 7.

The results are set forth below:

| Example Number | Refractory | Extent of Cut, mm. | |
|---|---|---|---|
| | | Melt Line | Mid-Point |
| 28 | Without $Cr_2O_3$ | 1.68 | 0.91 |
| 29 | With $Cr_2O_3$ | 0.51 | 0.56 |

As seen above, the $Cr_2O_3$ addition results in improved corrosion resistance both at the melt line and at the mid-point. Not only are the present refractories free from cracking which occurs in standard chrome bricks when used with such glasses, but the cost is considerably below that of the standard chrome refractory.

EXAMPLES 30–31

The effect of the $Cr_2O_3$ addition to the refractories of this invention was also observed in contact with molten soda-lime glass for 72 hours at 1538° C. Fused-cast refractories were prepared from batches containing, by weight, 80% zirconia, 10% monazite, 8% alumina and 2% $Cr_2O_3$, and 80% zirconia, 10% monazite, 4% alumina and 6% $Cr_2O_3$.

Specimens of the two refractories were immersed in the molten glass and the results appear below:

| Example Number | Refractory | Extent of Cut, mm. | |
|---|---|---|---|
| | | Melt Line | Mid-Point |
| 30 | With 2% $Cr_2O_3$ | 2.36 | 0.72 |
| 31 | With 6% $Cr_2O_3$ | 2.18 | 0.47 |

Thus, the increase in $Cr_2O_3$ content at the expense of alumina is seen to improve the corrosion resistance of the refractory.

The benefit of the addition of from 0.03 to 4% and preferably from 0.1 to 2% of a halogen, especially fluorine, is demonstrated in the following examples. The halogen may conveniently be added as a metal halide. Suitable metal halides for this purpose include $CaF_2$, $AlF_3$, $MgF_2$, $BaF_2$, $SrF_2$, NaF, $CaCl_2$, $MgCl_2$, NaCl, KCl, NaI, KI, NaBr, and KBr.

EXAMPLE 32

A refractory batch was prepared by mixing, by weight, 76.8% zirconia, 9.6% alumina, 9.6% monazite and 4% $AlF_3$. The batch was melted, cast and specimens were cut from the casting.

On contact with molten borosilicate glass, the refractory exhibited a Blister Rating of 8-12 which compares very favorably with the Blister Rating of 38 for standard zirconia-alumina Refractory B and is equivalent to the Blister Rating for a refractory of, by weight, 80% zirconia, 10% alumina and 10% monazite.

Also, in corrosion testing in contact with a soda-lime glass the resistance was found to be equivalent to the 80% zirconia-10/alumina-10% monazite refractory, without a halogen addition. No stoning is observed in the glass in contact with the halogen containing refractory.

Thus, the addition of a halogen in the stated proportions to the refractories of this invention does not effect their superior corrosion resistance and low stoning and blistering, and has been observed to improve the density, microstructure and manufacturability of the refractories.

EXAMPLES 33-39

The present materials also have good thermal shock resistance. This property was tested in the following manner:

A 1" x 1" x 3" sample is heated from room temperature to 1400° C., held for 10 minutes at that temperature and then cooled rapidly at room temperature. This constitutes one complete cycle. After each cycle, the sample is examined for cracking and spalling of small pieces. When the sample has spalled, the test is stopped and the number of cycles is recorded.

Any sample which lasts over about 5 cycles is considered to have good thermal shock resistance in the 1400° C. test. In a similar test conducted up to 1650° C., survival for 4 or more cycles is considered evidence of good thermal shock resistance.

The results of several such tests are reported in the following table.

TABLE

| Ex. No. | Refractory Composition Tested, weight percent | 1,400° C., No. of Cycles | 1,650° C., No. of Cycles |
|---|---|---|---|
| 33 | 80% Q-1 $ZrO_2$, 10% $Al_2O_3$, 10% Monazite | 19, 10 | |
| 34 | 80% Q-23 $ZrO_2$, 10% $Al_2O_3$, 10% Monazite | 8, 9 | |
| 35 | 80% African $ZrO_2$, 10% $Al_2O_3$, 10% Monazite | 5 | |
| 36 | 76.0% Q-23 $ZrO_2$, 9.5% $Al_2O_3$, 9.5% Monazite, 5.0% $Na_2O$ | 4 | |
| 37 | 80% Q-23 $ZrO_2$, 19.5% $Al_2O_3$, 0.5% Monazite | 3 | |
| 38 | 80% Q-23 $ZrO_2$, 18% $Al_2O_3$, 2.0% Monazite | 2 | |
| 39 | 80% Q-23 $ZrO_2$, 15% $Al_2O_3$, 5.0% Monazite | 10 | |

Where thermal shock resistance is important, the above data indicates that a monazite content of about 5% or greater or an equivalent rare earth oxide content of about 2% or greater is desirable.

The Q-1 $ZrO_2$ material had the following typical analysis, by weight: 96.15% $ZrO_2$ (including about 2% $HfO_2$), 1.0% max. $Al_2O_3$, 0.8% max. $SiO_2$, 0.75% max. CaO and 0.5% max. $Fe_2O_3$.

EXAMPLES 40-43

The present refractories also exhibit relatively low exudation. Exudation testing was conducted to measure the quantity of glassy phase exuded from the refractory when heated. The test was carried out in the following manner:

A 1" x 1" x ⅛" highly ground sample is placed on a platinum sheet at 1500° C. for 16 hours. Using a technique of weighing the sample in water, before and after the heat treatment, the amount of glassy phase lost is measured in terms of the percent change in volume of the sample.

Two refractory compositions prepared in accordance with the invention were compared with standard Refractory B in exudation tests. The results with Refractory B, Examples 40 and 41, and the results with the other refractories, Examples 42 and 43, are reported in the following table. The refractory of Example 42 contained, by weight, 80% zirconia (Norton Q-23), 10% alumina and 10% monazite (Titanium Alloy Co.). The refractory of Example 43 contained, by weight, 76.8% zirconia (Norton Q-23), 9.6% alumina, 9.6% monazite (Titanium Alloy Co.) and 4.0% $AlF_3$.

TABLE

| | Exudation Test (16 hrs. at 1,500° C.) | | | |
|---|---|---|---|---|
| | Before | After | Diff. | Percent Change |
| Example 40: | | | | |
| Dry | 6.68 | 6.65 | | |
| Wet | 4.93 | 4.71 | | |
| Vol | 1.75 | 1.94 | .19 | 10.9 |
| Example 41: | | | | |
| Dry | 6.39 | 6.35 | | |
| Wet | 4.69 | 4.50 | | |
| Vol | 1.70 | 1.85 | .15 | 8.8 |
| Example 42: | | | | |
| Dry | 7.97 | 7.96 | | |
| Wet | 6.31 | 6.25 | | |
| Vol | 1.66 | 1.71 | .05 | 3.0 |
| Example 43: | | | | |
| Dry | 9.35 | 9.31 | | |
| Wet | 7.40 | 7.38 | | |
| Vol | 1.95 | 1.93 | .02 | 1.0 |

From the above, it can be seen that the percent change in volume of the standard Refractory B, tested in Examples 40 and 41 is on the order of 10%. The low exudation of the materials of this invention, Examples 42 and 43, is evidenced by a volume change of only 3.0% and 1.0% respectively.

EXAMPLES 44-46

Using a substantial amount of zircon, (zirconium silicate) as a raw material the following two high silica refractory compositions were prepared on a weight basis as follows:

| | Example 44, Percent | Example 45, Percent |
|---|---|---|
| $ZrO_2$(Norton Q-1) | 38.6 | 37.8 |
| $Al_2O_3$ | 9.7 | 9.5 |
| Zircon | 48.2 | 47.3 |
| $Na_2O$ | 2.5 | 2.4 |
| Monazite | 1.0 | 3.0 |

The refractories were tested in contact with a soda-lime glass to determine corrosion resistance and stoning, in comparison with a sample of standard refractory B. The samples were in contact with the soda-lime glass for three days at 1538° C. The composition of the soda-lime glass is given above. The results, set forth in the following table, indicate the superior corrosion resistance and lower stoning of the high silica refractories of the invention, Examples 44 and 45, as compared with the standard refractory B.

TABLE

| Refractory Composition | Extent of Cuts, mm. | | | Stoning | Temp., days |
|---|---|---|---|---|---|
| | Melt Line | Mid-Point | Average | | |
| Example 44 | 2.77 | 0.38 | 1.58 | Few | 1,538° C., 3 days. |
| Example 45 | 1.56 | 0.36 | 0.96 | Few | Do. |
| Example 46 [1] | 3.93 | 2.04 | 2.99 | Many | Do. |

[1] Standard Refractory B.

Although the present invention has been described with reference to certain preferred embodiments, it will be understood that various changes and modifications may be made in the procedures and products without departing from the scope of the invention as defined in the following claims.

What is claimed is:

1. A fused refractory material comprising primarily crystalline zirconia, said material consisting essentially of the following constituents analytically, on a weight basis:

at least 50% $ZrO_2$,
1% to 29% $Al_2O_3$,
0.1% to 25% $SiO_2$,
0.5 to 15% rare earth oxide,
up to 6% $P_2O_5$,
up to 5% alkaline earth oxide,
up to 4% alkali metal oxide,
up to 47% $Cr_2O_3$,
up to 25% FeO,
up to 4% halogen, and
at least 90% of $ZrO_2$ plus $Al_2O_3$ plus $SiO_2$ plus rare earth oxide plus $Cr_2O_3$ plus FeO plus halogen.

2. The fused refractory material of claim 1 containing at least 0.25% by weight $Cr_2O_3$.

3. The fused refractory material of claim 1 containing at least 0.03% by weight halogen.

4. The fused refractory material of claim 1 wherein said material consists essentially of the following constituents, analytically on a weight basis:

at least 60% $ZrO_2$,
2% to 21% $Al_2O_3$,
4% to 18% $SiO_2$,
1.5% to 9% rare earth oxide,
up to about 3.5% $P_2O_5$,
up to about 2.5% alkaline earth oxide,
up to about 2.5% alkali metal oxide, and
at least 93% of $ZrO_2$ plus $Al_2O_3$ plus $SiO_2$ plus rare earth oxide.

5. The fused refractory material of claim 4 wherein the $P_2O_5$ is at least 1% by weight.

6. The fused refractory material of claim 4 wherein the alkali oxide is at least 0.5% by weight.

7. The fused refractory material of claim 4 wherein the $P_2O_5$ is at least 1% by weight and the alkali oxide content is at least 0.5% by weight.

8. The fused refractory material of claim 1 wherein said material consists essentially of the following constituents, analytically on a weight basis:

50% to 98% $ZrO_2$,
1% to 29% $Al_2O_3$,
0.1% to 25% $SiO_2$,
0.5% to 15% rare earth oxide,
up to about 6% $P_2O_5$,
up to about 5% alkaline earth oxide,
up to about 4% alkali oxide,
up to about 25% FeO,
0.25% to 47% $Cr_2O_3$, and
at least 90% of $ZrO_2$ plus $Al_2O_3$ plus $SiO_2$ plus rare earth oxide plus FeO plus $Cr_2O_3$.

9. The fused refractory material of claim 8 wherein the $P_2O_5$ is at least 1% by weight.

10. The fused refractory material of claim 9 wherein the alkali oxide is at least 0.5% by weight.

11. The fused refractory material of claim 9 wherein the $P_2O_5$ is at least 1% by weight and the alkali oxide is at least 0.5% by weight.

12. The fused refractory material of claim 1 wherein said material consists essentially of the following constituents, analytically on a weight basis:

60% to 87.5% $ZrO_2$,
5% to 21% $Al_2O_3$,
4% to 18% $SiO_2$,
1.5% to 9% rare earth oxide,
1% to 3.5% $P_2O_5$,
up to about 2.5% alkaline earth oxide,
up to about 2.5% alkali oxide,
up to about 7% FeO,
1% to 15% $Cr_2O_3$, and
at least 93% of $ZrO_2$ plus $Al_2O_3$ plus $SiO_2$ plus rare earth oxide plus FeO plus $Cr_2O_3$.

13. The fused refractory material of claim 1 wherein said material consists essentially of the following constituents, analytically on a weight basis:

50% to 98% $ZrO_2$,
1% to 29% $Al_2O_3$,
0.1% to 25% $SiO_2$,
0.5 to 15% rare earth oxide,
up to about 6% $P_2O_5$,
up to about 5% alkaline earth oxide,
up to about 4% alkali oxide,
0.03% to 4% fluorine, and
at least 90% of $ZrO_2$ plus $Al_2O_3$ plus $SiO_2$ plus rare earth oxide plus fluorine.

14. The fused refractroy material of claim 13 wherein the $P_2O_5$ is at least 1% by weight.

15. The fused refractory material of claim 1 wherein said material consists essentially of the following constituents, analytically on a weight basis:

60% to 89.4% $ZrO_2$,
5% to 21% $Al_2O_3$,
4% to 18% $SiO_2$,
1.5% to 9% rare earth oxide,
1% to 3.5% $P_2O_5$,
up to about 2.5% alkaline earth oxide,
up to about 2.5% alkali oxide,
0.1% to 2% fluorine, and
at least 93% of $ZrO_2$ plus $Al_2O_3$ plus $SiO_2$ plus rare earth oxide plus fluorine.

References Cited

UNITED STATES PATENTS 3,132,953  5/1964  Alper et al. _____ 106—57

FOREIGN PATENTS 14,348  9/1962  Japan.

JAMES E. POER, Primary Examiner

U.S. Cl. X.R.

106—66